No. 779,708. PATENTED JAN. 10, 1905.
J. HAMMOND.
BAND CUTTER AND FEEDER FOR THRESHING MACHINES.
APPLICATION FILED MAY 28, 1904.
2 SHEETS—SHEET 1.
Fig. 1.
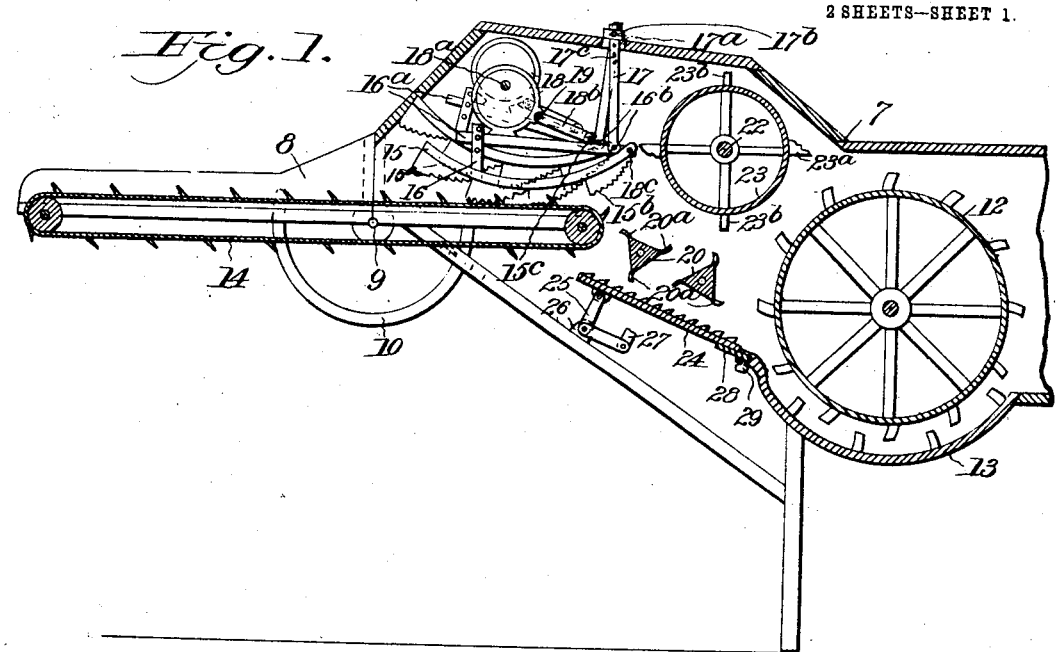
Fig. 2.
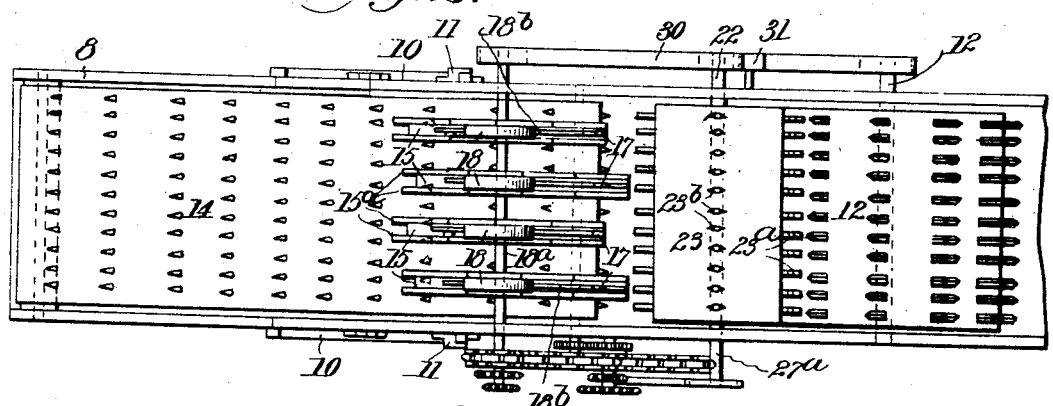
Fig. 5.
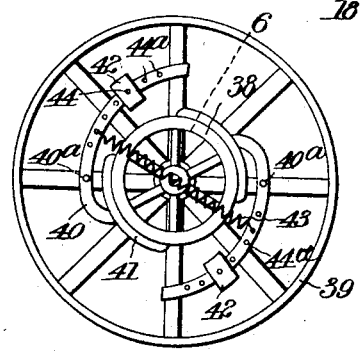
Fig. 6.
WITNESSES:
INVENTOR
James Hammond
BY
Milo B. Stevens and Co.
Attorneys.

No. 779,708. PATENTED JAN. 10, 1905.
J. HAMMOND.
BAND CUTTER AND FEEDER FOR THRESHING MACHINES.
APPLICATION FILED MAY 28, 1904.
2 SHEETS—SHEET 2.
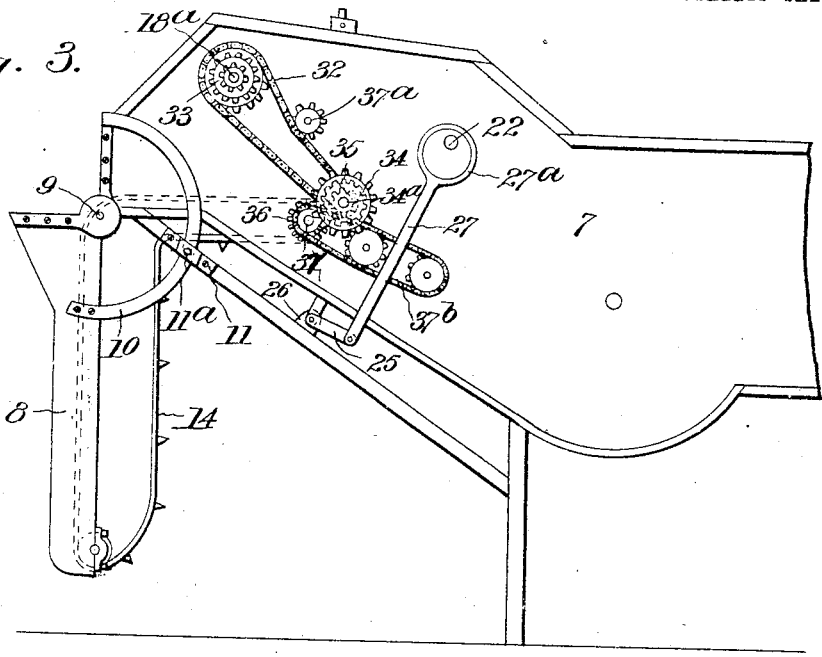
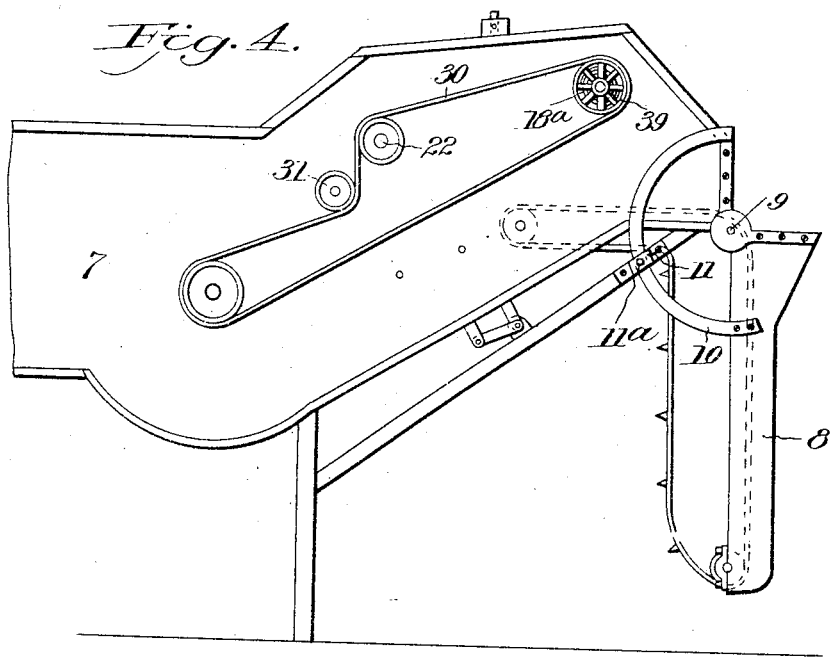
WITNESSES:
C. H. Walker
M. A. Schmidt
James Hammond INVENTOR
By
Milo B. Stevens 2nd Co.
Attorneys No. 779,708.

Patented January 10, 1905.

UNITED STATES PATENT OFFICE.

JAMES HAMMOND, OF WINNETOON, NEBRASKA.

BAND-CUTTER AND FEEDER FOR THRESHING-MACHINES.

SPECIFICATION forming part of Letters Patent No. 779,708, dated January 10, 1905.

Application filed May 28, 1904. Serial No. 210,256.

*To all whom it may concern:*

Be it known that I, JAMES HAMMOND, a citizen of the United States, residing at Winnetoon, in the county of Knox and State of Nebraska, have invented new and useful Improvements in Band-Cutters and Feeders for Threshing-Machines, of which the following is a specification.

My invention relates to a band-cutter and feeder for threshing-machines, and has for its object improved means for cutting the bands of the bundles and spreading out and evenly feeding the grain to the threshing-cylinder.

A further object is to provide a simple and efficient governor for regulating the feed according to the speed of the threshing-cylinder.

With these and other objects in view the invention consists in certain novel features of construction hereinafter described, and pointed out in the claims, reference being had to the appended drawings, forming part hereof, in which—

Figure 1 is a longitudinal section, and Fig. 2 a plan view. Figs. 3 and 4 are side elevations from opposite sides of the machine with the feeder-frame folded down. Fig. 5 is an enlarged view of the governor. Fig. 6 is a transverse section on the line 6 6 of Fig. 5.

Referring specifically to the drawings, 7 denotes the main frame of a threshing-machine, at the front end of which the feeder-frame 8 is hinged, as at 9, to fold down, as shown in Figs. 3 and 4. Said frame carries on each side an arc 10, which extends through a bearing-block 11 on the sides of the main frame and in which it is fastened by a set-screw $11^a$, whereby the feeder-frame is held in adjusted position. The threshing-cylinder is indicated at 12, the concave at 13, and the feeder belt or apron at 14.

The band-cutters are located above the feeder-belt, near the rear end thereof, and comprise a frame 15, to which a series of knives $15^a$ are secured. Eight of such knives are shown, four being on each side of the frame, and they have curved sickle-shaped cutting edges $15^b$. The knife-frame 15 is secured at its front end by a strap 16 to a supporting frame or bar $16^a$, its rear end being hinged to said frame, as at $16^b$. The strap has a number of bolt-holes to enable the knife-frame to be adjusted at different slants. The rear end of the frame is suspended from a rod 17, the upper end of which extends through a slotted support $17^a$ at the top of the main frame, in which it is held by a pin $17^b$. A number of pin-holes $17^c$ are provided in the rod 17 to permit vertical adjustment of the rear end of the frame. The bar $16^a$ is oscillated to operate the knives by an eccentric 18 on a shaft $18^a$, extending across and journaled in the main frame of the machine, said bar $16^a$ having thereon a ring $16^c$, in which the eccentric works. This ring is connected by a rod $18^b$ to the rear end of the frame $16^a$, as at $18^c$, the front end thereof being connected to the eccentric, as at 19. A series of four band-cutters, as above described, are provided, each of which is mounted and operated in the manner stated. The feed-belt has spikes which slant rearwardly in opposite directions to the cutting swing of the band-cutters, which will hold the bundles while the bands are being cut.

The retarders are shown at 20. Two of such are provided, and they are located between the rear end of the feeder-belt and the threshing-cylinder. They have curved teeth $20^a$, which are set on triangular shafts at the corners thereof. The shafts are journaled in suitable bearings on the main frame.

Above the retarders a shaft 22 is journaled in the main frame, on which a spreading and auxiliary band-cutting cylinder 23 is mounted, having for its object to cut any bands or parts thereof which may have escaped the band-cutters $15^a$ and also to thoroughly comb or spread out the grain before it passes to the threshing-cylinder to prevent choking or clogging thereof. The cylinder 23 carries sickle-shaped knives $23^a$ and teeth or spikes $23^b$, which are arranged in rows alternately across the cylinder, as shown.

The feed-board 24 is located below the retarders, as usual, and is connected at its upper end to one arm of a bell-crank lever 25, fulcrumed on a support 26. The other end of the lever is connected by a rod 27 to an eccentric $27^a$ on the shaft 22, whereby motion is imparted to the feed-board. The lower end of the feed-board is supported on a shelf 28, which fits in the main frame, being held in place by a set-screw 29. By loosening the latter the shelf can be removed and the feed-board dropped downwardly, whereby access is had to the inside of the machine.

The shaft $18^a$ and the cylinder-shaft 22 are driven by a belt 30 from the shaft of the threshing-cylinder 12, an idler 31 being provided to tighten the belt. The feeder-belt 14 is driven from the shaft $18^a$ by a chain 32, extending around one of a number of sprockets 33 on said shaft and one of a like series of sprockets 34 on a shaft $34^a$, which carries a spur-wheel 35, in mesh with a pinion 36 on the shaft 37 of the feeder-belt. The sprockets 33 and 34 are properly proportioned, so that a change of speed is had when the chain 32 is shifted thereon. An idler $37^a$ holds the chain in operative position, and by moving the idler out of contact therewith the chain can be shifted on the sprockets to change the speed without stopping the machine. The retarders 20 are driven by chains $37^b$ from the shaft 37.

The governor is on the eccentric-shaft and comprises a small wheel 38, which is keyed thereto and has a V-shaped groove $38^a$ in its rim. The belt-wheel 39, around which the belt 30 extends, is loose on the shaft and carries lever-arms 40, which have at one end shoes 41, shaped to fit in the groove $38^a$. The arms are pivoted at diametrically opposite points on the belt-wheel, as at $40^a$, and carry at their outer ends a weight 42, and they are also connected by a coiled spring 43. The weights are secured to the arms by pins 44, extending through one of a series of holes $44^a$ whereby they can be adjusted on the arms. The spring is adjustable, its ends being hooked in the holes $44^a$.

The purpose of the governor is to regulate the speed of the band-cutters, feeder-belt, and retarders according to the speed of the threshing-cylinder. Rotation of the belt-wheel causes the arms 40 to swing outwardly on their pivot, which forces the shoes 41 into the groove of the wheel 38, which will thus be clutched and will turn with the belt-wheel. When the speed of the latter slacks, the arms will move inwardly, being assisted by the springs 43, and their grip on the wheel 38 will then be diminished, so that it will rotate at a slower speed or stop altogether if the belt-wheel slacks sufficiently to cause the arms to move inwardly far enough to remove the shoes entirely out of contact with the wheel 38. The feed of the grain to the threshing-cylinder is therefore at all times under control, as it depends on the speed thereof, whereby all liability to a choking or clogging and consequent breaking of parts is avoided.

Having thus described my invention, what is claimed as new, and desired to be secured by Letters Patent, is—

1. The combination in a threshing-machine, of a frame having a threshing-cylinder and band-cutters mounted therein; a conveyer; and a combined spreading and cutting cylinder between the threshing-cylinder and the band-cutters, said spreading and cutting cylinder having teeth and knives arranged lengthwise thereon in alternate rows.

2. The combination in a threshing-machine, of a frame having retarders rotatably mounted therein and working under the grain; a conveyer; and a combined spreading and cutting cylinder above the retarders, said cylinder having teeth and knives arranged lengthwise thereon in alternate rows.

In testimony whereof I have signed my name to this specification in the presence of two subscribing witnesses.

JAMES HAMMOND.

Witnesses:
ERNST SCHEER, Jr.,
H. J. KREMNIR.